Aug. 20, 1940. L. L. McCART Re. 21,534

CARD SLOTTER

Original Filed July 24, 1937 2 Sheets-Sheet 1

Inventor
Lucien L. McCart
By
Harry Lee Dodson
Attorney

CARD SLOTTER

Original Filed July 24, 1937 2 Sheets-Sheet 2

Inventor
Lucien L. McCart
By
Harry Lea Dodson
Attorney

Reissued Aug. 20, 1940 Re. 21,534

UNITED STATES PATENT OFFICE 21,534

CARD SLOTTER

Lucien L. McCart, Forest Hills, N. Y., assignor to E. V. Snyder, Ridgewood, N. Y.

Original No. 2,144,412, dated January 17, 1939, Serial No. 155,505, July 24, 1937. Application for reissue May 31, 1940, Serial No. 338,289

13 Claims. (Cl. 164—111)

The object of my invention is to provide a method of and means for preparing record cards in such a manner that they may be sorted mechanically.

In U. S. Letters Patent 1,544,172 to Alfred Perkins, a device for sorting cards is shown which consists in initially punching a line or lines of spaced holes along one or more edges of a card or stiff paper slip on which information of one kind or another is to be entered. These holes are identically spaced in great numbers of such cards and are individually numbered or otherwise identified. In the use of these prepared cards the card is cut away between one or more of these holes and the adjacent edge, according to some predetermined system by which the locations of the holes so opened identifies a name, a number or some other desired information or classification. When these slotted cards are stacked on edge and in alignment, so that the holes in all the cards form continuous channels through the stack, a thin rod or so-called needle is thrust through one of the holes and lifted laterally. The cards in which that particular hole has not been slotted will thus be lifted out of the stack, while all cards in which the hole has been slotted through to the edge will permit the needle to pass through the slot and thus will remain in the tray or container. By repetition of this operation on successive holes or combinations thereof the cards may be sorted into desired classes with great rapidity. Reference may be made to the aforesaid patent for a more detailed description of this system, which has come into widespread use.

My invention is adapted for use with the sorting system above described, and utilizes the cards described therein, these cards being previously punched with a line of located and identified holes adjacent one or more of the edges. The improvement herein described and claimed consists in providing for the repetition of any given combination of slots (by which certain holes are opened to the edge of the card) without forming these slots individually, as has formerly been the practice. More specifically, the invention lies in providing a gang slotting tool capable of slotting all the holes in any one side of the card at a single stroke, this tool being so arranged that any desired combination of the individual punches may be rendered operative and the remainder rendered inoperative by the insertion on the tool of a mask or key plate.

A device of this class may be put to various uses of which the following is perhaps the most important example. Sales slips made out by store departments, filling stations and the like may have the copy which goes to the billing office punched along one or more edges with holes representing numbers, as described in the Perkins patent. Each customer is assigned an identifying number and is provided with a metal slip punched or slotted to act as the keyplate for that number, as will be described. Each selling department or station is provided with one of the gang punches hereinafter described and which, in addition to the controllable punches may have additional fixed punches so located as to identify the department or station from which the sales slip issues. When a purchase is made the customer presents his key plate which is inserted in the punch and the sales slip slotted. The key plate thus not only positively identifies the customer, acting as a credit card or charge plate, but also permits all the sales slips prepared with it to be immediately sorted out of the mass of sales slips which accumulates during any given billing period. The fixed punches, which are the identification of the issuing station, permit the sales of any station or department to be sorted out for calculation. Many other uses will suggest themselves to persons familiar with the Perkins method of sorting.

The described end may be attained by various mechanical contrivances, of which two types will be illustrated. In the first type the punches are so suspended that the insertion of the key plate swings some of the individual punches out of register with the actuating means and thus renders them inoperative. This type is illustrated in Figs. 1 to 6 of the drawings. In the second type all of the punches are depressed by means of springs and the individual punches which it is desired to render inoperative are withheld against the spring tension by blank areas of the key plate. This type is illustrated in Figs. 7 and 8 of the drawings.

The following is a brief description of the accompanying drawings.

Figure 2:
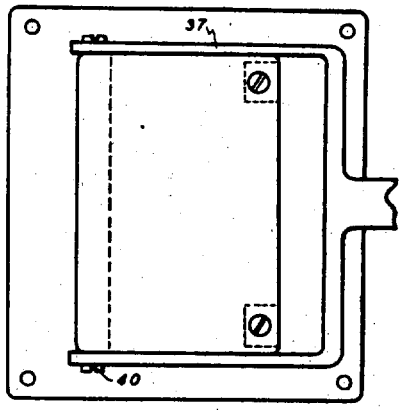
Fig. 2 is a plan view of the top of the same device, as on the line 2—2 of Fig. 1.
Figure 1:
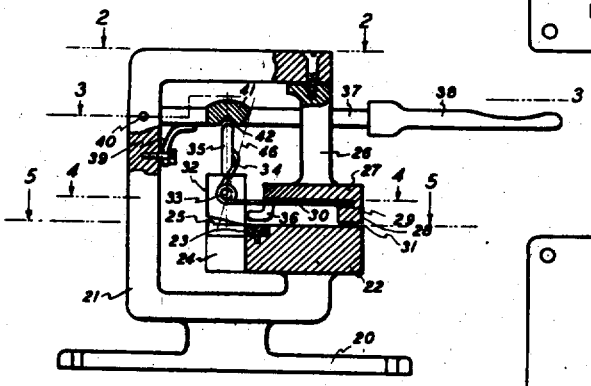
Fig. 1 is a vertical partial section through an exemplary device of the first type, as on the line 1—1 of Fig. 3.
Figure 4:
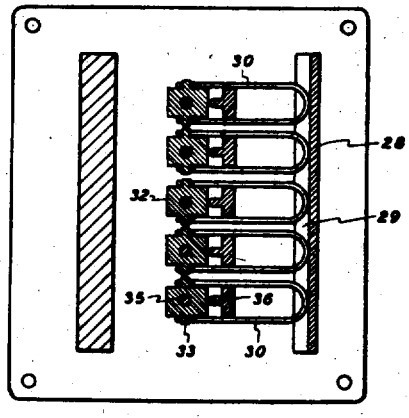
Fig. 4 is a plan section of the same devices as on the line 4—4 of Fig. 1.
Figure 3:
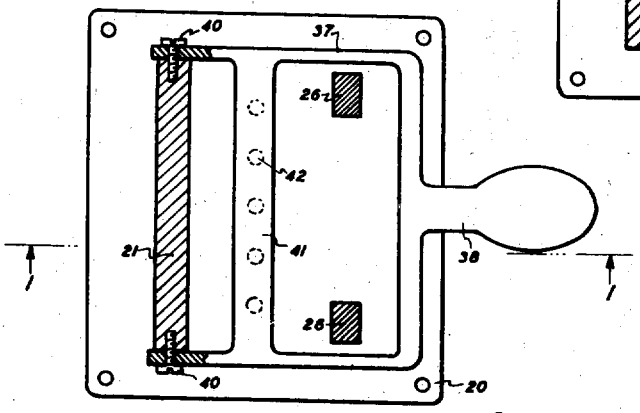
Fig. 3 is a plan section of the same device as on the line 3—3 of Fig. 1.
Figure 5:
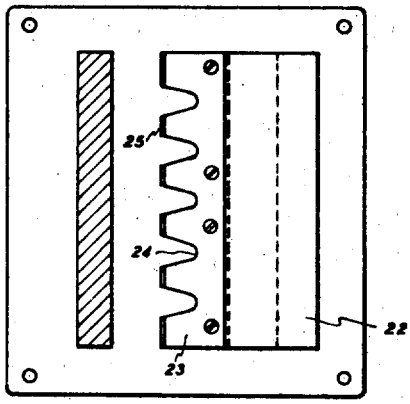
Fig. 5 is a plan section of the same device as on the line 5—5 of Fig. 1.

Referring first to Figs. 1 to 5, a base plate 20 supports a frame 21 of which an anvil 22 is a part. The anvil is provided on its upper face with a hard metal die plate 23, the anvil and die-plate being slotted along one edge as at 24. The extreme edge of the die-plate is slightly upraised as at 25 to form a stop for the key-plate and the card to be described.

Frame 21 carries pillars 26—26 which for assembling may be made detachable as shown but which are permanently fastened in place. Integral with these pillars is a spring-plate 27 which is projected downwardly as at 28 and provided with a slot 29 into which the ends of springs 30—30 may be forced. Projection 28 is spaced from anvil 22, as indicated at 31, to permit the insertion of a key-plate and card.

A desired number of slotting punches 32—32 (five are shown in the drawings but a much larger number would be required in practice) are each provided with a pivot pin 33. About each end of this pin one arm of spring 30 is wound, the outer end 34 of one side of the spring being wound around an upward projection 35 from the punch body. This spring arrangement holds the punch suspended above the die but capable of downward movement by bending of the straight portion of the spring, and also tends to tilt its lower end toward the die, this tilting movement being limited by stops 36 projected from spring plate 27 so as to cause the punch to remain normally vertical and in shearing relation with the die. These stops also act to prevent lateral movement of the punches and to hold them in register with slots 24 in the die-plate.

A yoke 37 provided with a light thumb lever 38 and a supporting spring 39 is pivoted at each end as at 40—40. This yoke carries a cross-bar 41 which actuates the punches when the thumb lever is depressed. The lower side of this bar may desirably be provided with cone-shaped depressions 42 arranged to receive the upper ends of projections 35 and thus hold the punches in alignment during the slotting stroke.

Figure 6:
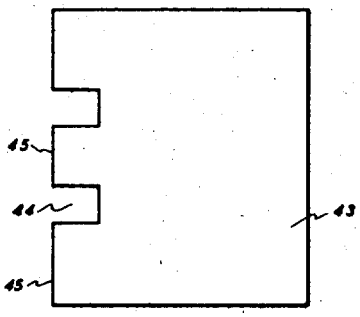
Fig. 6 is a plan of the keyplate used in the devices of the first and second types.

The key-plate 43 shown in Fig. 6 is provided with openings adapted to register with one or more of the die slots 24 but preferably of somewhat greater size. Each of these key-plates has a different combination of openings arranged according to some predetermined system of identification. It will be understood that the dies and key-plates have their openings spaced according to the spacing of the previously punched holes in the cards to be used.

The punches, when at their normal elevation, i. e., when not depressed by the cross-bar, are of such length as to permit the card to pass beneath them when inserted through clearance space 31 and brought against stops 25. The key-plate, however, which is inserted over the card, should engage the keel of the punch in passing toward the stops, thus tilting some of the punches out of the vertical position and into the position indicated by broken line 46 of Fig. 1. In this position the stem 35 of the punch does not engage the cross-bar when the latter is depressed, and thus all the punches except those registering with openings 44 of the individual key-plate are rendered inoperative and the card is slotted only at the locations of the specific key-plate openings.

Figure 7:
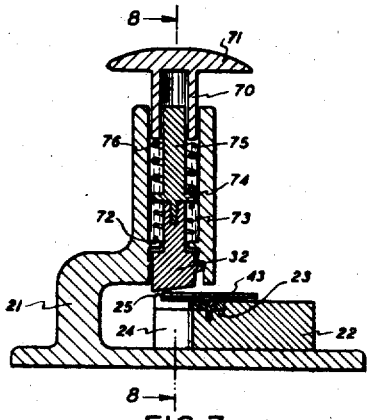
Fig. 7 is a vertical cross section through an exemplary device of the second type, as on the line 7—7 of Fig. 8.
Figure 8:
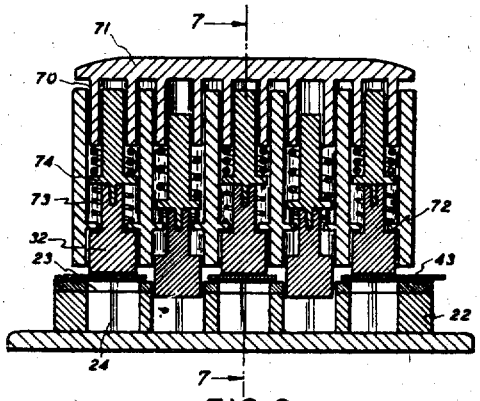
Fig. 8 is a vertical longitudinal section through the same device as on the line 8—8 of Fig. 7.

Referring now to Figs. 7 and 8, the frame 21 is bored from opposite ends to form a guide for punches 32 and a series of tubes 70. These tubes are formed with or attached to a head piece 71 which, if desired, may be operated by a lever as in the preceding structure. An internal shoulder 72 is left between the ends of the bores to engage the lower end of a light spring 73, the tension on this spring being merely such as to return the punch to its elevated position after the card is slotted. The upper end of this spring engages a collar 74 on the punch stem 75, which for assembling may be screwed into the punch proper as shown. The upper face of collar 74 engages the lower end of a much stiffer spring 76, the upper end of this spring bearing on the end of tube 70.

When a key-plate 43 similar to that shown in Fig. 6 is inserted, with a card beneath it, against stops 25, and the headpiece 71 pressed down, the punches which are in register with openings 44 are forced through the card by the relatively stiff springs 75, while those punches which encounter blank areas of the plate are held up by it, the upper springs collapsing to permit tubes 70 to move downwardly while the punches remain stationary. In this form the punches which are rendered inoperative by the key-plate are locked up instead of being tilted out of position as in the first type. It will be evident that springs 75 must be stiff enough to force the punches through the card and the key-plate must be strong enough to support the spring pressure without being dented by the punches.

I claim as my invention:

1. In a device for slotting cards; a plurality of slotting punches arranged in a substantially straight line, said punches being independently and tiltably supported by resilient members; a die-plate adapted to register with said punches when said punches are in a retracted position; resilient means for normally maintaining said punches in register with said die-plate; a key-plate having openings in its edge and adapted when inserted in said device to tilt at least one of said punches out of said retracted position, and lever means engaging and operating through the slotting stroke only such of said punches as remain in retracted position after the insertion of said key-plate.

2. In a device for slotting cards; a plurality of slotting punches arranged in a substantially straight line; a die-plate cooperating with said punches; a common means for simultaneously actuating all of said punches through the slotting stroke; an independent resilient element interposed between each of said punches and said actuating means, and a key-plate arranged to be interposed between said punches and said card and having at least one opening therein, through which a punch may operate, the blank areas of said key-plate rendering other of said punches inoperative by engaging last said punches and thereby collapsing the corresponding interposed resilient members.

3. In a device for slotting cards; a plurality of slotting machines arranged in a substantially straight line; a die-plate cooperating with said punches; means capable of simultaneously actuating all of said punches through the slotting stroke, and resilient means cooperating with a key-plate adapted for insertion in said device to render at least one of said punches inoperative and to leave the remainder of said punches operative through the slotting stroke.

4. In a device for slotting cards; a plurality of slotting punches arranged in a substantially straight line, each of said punches being normally operative but capable of being rendered individually inoperative; a die-plate cooperating with said punches; means capable of simultaneously actuating all of said punches through the slotting stroke, and a key-plate adapted for insertion in said device having solid portions arranged to render at least one of said punches inoperative by interrupting its movement toward said die-plate and openings arranged to permit normal operation of the remainder of said punches.

5. In a device for notching cards, a plurality of edge notching punches arranged in a substantially straight line, a die plate cooperating therewith, means capable of actuating all of said punches through the edge notching stroke, resilient means cooperating with a removable notched key element adapted to be interposed between the card to be edge notched and said punches whereby said card will be edge notched with a pattern similar to that on the key element.

6. In a device for notching cards, a plurality of edge notching punches arranged in a substantially straight line, a die plate cooperating therewith, means capable of actuating all of said punches through the edge notching stroke, a removable notched key element adapted to be interposed between the card to be edge notched and said punches whereby said card will be edge notched with a pattern similar to that on the key element, and resilient means cooperating therewith.

7. In a device for notching cards, a plurality of notching punches, a die plate cooperating therewith, means capable of simultaneously actuating all of said punches through the notching stroke, a removable key element the edge of which is notched adapted to be interposed between the card to be notched and said punches whereby said card will be notched with a pattern similar to that on the key element, and resilient means cooperating therewith.

8. In a device for notching the edge of a card with punches, a key plate having an edge containing a pattern of edge notches conforming to a predetermined classification, said edge notches arranged to permit certain punches to pass through them and reproduce the pattern on the edge of the card, said key plate having an unnotched portion for preventing certain other punches from acting upon the card.

9. In a device for notching the edge of a card with punches, a key plate of harder material than the card to be notched adapted to be inserted between the punches, and a card to be notched, said plate having at least one notch in its edge through which a punch may pass, the unnotched portion of the edge of said plate being adapted to bear upon the other punches and render them inoperative.

10. In a device for slotting cards; a plurality of slotting punches arranged in a substantially straight line; a die-plate cooperating with said punches; means capable of simultaneously actuating all of said punches through the slotting stroke and resilient means cooperating with punch selecting means adapted for cooperation with said device to render at least one of said punches inoperative and to leave the remainder of said punches operative through the slotting stroke, and means for aligning an edge of a card to be slotted in the path of said punches for the purpose of forming notches in the card which open to the edge thereof.

11. In a device for slotting cards; a plurality of slotting punches arranged in a substantially straight line; each of said punches being normally operative but capable of being rendered individually inoperative; a die plate, cooperating with said punches; means capable of simultaneously actuating all of said punches through the slotting stroke, punch selecting means adapted for cooperation with said device having certain portions arranged to render at least one of said punches inoperative and other portions arranged to permit normal operation of the remainder of said punches, and means for aligning an edge of a card to be slotted in the path of said punches for the purpose of forming notches in the card which open to the edge thereof.

12. In combination with a device for slotting cards having a plurality of slotting punches arranged in a substantially straight line, a die-plate cooperating with said punches, means capable of simultaneously actuating all of said punches through a slotting stroke; a key-plate insertable between said punches and a card to be slotted, said key-plate having a notched edge defining a pattern to be imparted to an edge of said card, said key-plate having a sufficiently higher resistance to shear than said card to resist penetration of said punches.

13. In a device for slotting cards; a plurality of slotting punches arranged in a substantially straight line; a die-plate cooperating with said punches; means capable of simultaneously actuating all of said punches through a slotting stroke, a punch selecting element relatively movable with respect to said punches adapted for operating intermediate said means and a card to be slotter, to select certain of said punches for a subsequent slotting operation, and means for aligning an edge of a card to be slotted in the path of said punches for the purpose of forming notches in the card which open to the edge thereof.

LUCIEN L. McCART.